US006961313B1

(12) United States Patent
Gaspar

(10) Patent No.: US 6,961,313 B1
(45) Date of Patent: Nov. 1, 2005

(54) ARRANGEMENT FOR VERIFYING RANDOMNESS OF TBEB ALGORITHM IN A MEDIA ACCESS CONTROLLER

(75) Inventor: Harand Gaspar, Cupertino, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 838 days.

(21) Appl. No.: 09/725,088

(22) Filed: Nov. 29, 2000

(51) Int. Cl.[7] ............................................ H04L 12/26
(52) U.S. Cl. ...................... 370/242; 370/252; 370/282; 710/107
(58) Field of Search ................................ 370/216, 241, 370/242, 249, 250, 252, 282; 702/108, 121, 702/122; 709/230, 232; 710/32–107, 109; 714/100, 2, 47, 703, 712, 716, 724, 728, 714/739, 746, 748, 729

(56) References Cited

U.S. PATENT DOCUMENTS

| | | | | |
|---|---|---|---|---|
| 4,380,088 A * | 4/1983 | Lipcon | ........................ | 455/80 |
| 4,945,532 A * | 7/1990 | Hald | .......................... | 370/245 |
| 5,079,766 A * | 1/1992 | Richard et al. | ............. | 370/445 |
| 5,097,469 A * | 3/1992 | Douglas | ..................... | 714/712 |
| 5,936,962 A * | 8/1999 | Haddock et al. | ............ | 370/446 |
| 6,141,327 A * | 10/2000 | Kalkunte et al. | ........... | 370/252 |

* cited by examiner

*Primary Examiner*—Hassan Kizou
*Assistant Examiner*—Dmitry Levitan
(74) *Attorney, Agent, or Firm*—Manelli Denison & Selter PLLC; Leon R. Turkevich

(57) ABSTRACT

A testing arrangement is configured for evaluating the randomness of a number generated by a network device under test configured for sending a data packet on a network medium and generating a random number for an idle interval for a sensed collision. The testing arrangement includes a collision generator configured for generating a collision in response to transmission of the data packet on the network medium, and an analyzer configured for identifying time intervals that the network device under test is transmitting on the network medium. The analyzer, having detected a prescribed minimum number of the identified time intervals, analyzes the identified time intervals to determine the randomness of the random numbers generated by the network device under test. The collision generator may be implemented as a physical layer transceiver configured in a loopback mode, or a packet generator configured for outputting onto the network medium a colliding packet in response to detection of the data packet on the network medium. Hence, the identified time intervals can be used to determine whether sufficiently random numbers are generated for collision mediation according to the IEEE 802.3 TBEB algorithm.

20 Claims, 3 Drawing Sheets

ARRANGEMENT FOR VERIFYING RANDOMNESS OF TBEB ALGORITHM IN A MEDIA ACCESS CONTROLLER

BACKGROUND OF THE INVENTION

1. Field of the Invention

The present invention relates to testing of integrated network devices such as network interface devices configured for sending and receiving data packets according to a prescribed protocol such as IEEE 802.3 protocol, and testing of integrated network switches configured for switching the data packets between subnetworks.

2. Background Art

Local area networks use a network cable or other media to link stations on the network. Each local area network architecture uses a media access control (MAC) enabling a network interface card at each station to share access to the media.

The Ethernet protocol ISO/IEC 8802-3 (ANSI/IEEE Std. 802.3, 1993 edition) defines a half-duplex media access mechanism that permits all stations to access the network channel with equality. Each station includes an Ethernet interface card that uses carrier-sense multiple-access with collision detection (CSMA/CD) to listen for traffic on the media. Transmission by a station begins after sensing a deassertion of a receive carrier, indicating no network traffic. After starting transmission, a transmitting station will monitor the media to determine if there has been a collision due to another station sending data at the same time. If a collision is detected, both stations stop, wait a random amount of time, and retry transmission.

Any station can attempt to contend for the channel by waiting a predetermined transmission delay interval after the deassertion of the receive carrier, known as the interpacket gap (IPG) interval. If a plurality of stations have data to send on the network, each of the stations will attempt to transmit in response to the sensed deassertion of the receive carrier on the media and after the IPG interval, resulting in a collision.

Ethernet network nodes mediate collisions using a truncated binary exponential backoff (TBEB) algorithm, which provides a controlled pseudorandom mechanism to enforce a collision backoff interval before retransmission is attempted. According to the truncated binary exponential backoff algorithm, a station keeps track of the number of transmission attempts (j) during the transmission of a current frame. The station computes a collision backoff interval as a randomized integer multiple of a slot time interval, and attempts retransmission after the collision backoff interval. The station will attempt to transmit under the truncated binary exponential algorithm a maximum of sixteen times.

The collision backoff interval is calculated by selecting a random number of slot times from the range of zero to $2^j-1$. For example, if the number of attempts j=3, then the range of randomly selected number of slot times is [0,7]; if the randomly-selected number of slot times is four, then the collision backoff interval will be equal to four slot time intervals. According to Ethernet protocol, the maximum range of randomly selected slot times is $2^{10}-1$.

FIG. 1 is a flow diagram illustrating operation of the truncated binary exponential backoff (TBEB) algorithm, where the exponential range of randomly selected integers is based upon an integer value j corresponding to the value of an attempt counter ($N_A$), such that j=($N_A$). Hence, the operation of FIG. 1 can be characterized by the function f(j)=TBEB(j).

The TBEB algorithm according to the operation TBEB(j) begins in step 10, where the MAC checks if the value j is greater than or equal to ten. If the operand j is less than ten in step 10, then an exponential number of access attempts (A) is determined in step 12 according to the equation $A=2^j-1$. If in step 10 the operand j is greater than or equal to 10, the MAC then checks in step 14 if j equals 16. If j equals 16, then the frame or data packet to be transmitted is discarded in step 16 in accordance with Ethernet (ANSI/IEEE 802.3) protocol. If j is less than 16 in step 14, then the exponential number of access attempts is set in step 18 to $A=2^{10}-1$, or 1023.

After calculating the exponential number of access attempts A, the MAC randomly selects an integer value (k) in step 20 from the range between zero and the exponential number of access attempts and having a maximum value of 1023. The MAC then calculates the delay time ($t_D$) in step 22 by multiplying the predetermined slot time ($t_S$) with the randomly selected integer k.

A slot time ($t_S$) has a duration equal to 512 bit times for 10 and 100 Mbits/s networks. Hence, a slot time will have a duration of 51.2 microseconds in a 10 megabit per second network and 5.12 microseconds in a 100 megabit per second network. The slot time ($t_S$) for a 1000 Mbit/s network is selected in accordance with the network topology and propagation delay, and may have a duration equal to 4096 bit times.

Switched local area networks such as Ethernet (IEEE 802.3) based systems are encountering increasing demands for higher speed connectivity, more flexible switching performance, and the ability to accommodate more complex network architectures. Hence, network switch designers and test engineers need to be able to minimize the time and expense needed to evaluate designs during prototyping of Ethernet-based network systems.

However, operational testing of network devices having a media access controller may be insufficient for adequately testing the randomness of the TBEB algorithm implemented within the media access controller. In particular, conventional testing schemes of connecting a network device under test to a network emulator are incapable of determining whether the MAC within the device under test provides a reliable random selection of slot times, as required under IEEE 802.3; hence, an insufficiently tested network device that is deployed in a network may over time develop a bias for selecting lower numbers of slot times (and unfairly capture the medium), or a bias for selecting high numbers of slot times (resulting in a relative inability to successfully arbitrate with other devices during collision mediation).

SUMMARY OF THE INVENTION

There is a need for an arrangement that ensures that a network device under test reliably complies with the randomness requirements of the IEEE 802.3 TBEB algorithm.

These and other needs are attained by the present invention, where a testing arrangement is configured for evaluating the randomness of a number generated by a network device under test configured for sending a data packet on a network medium and generating a random number for an idle interval for a sensed collision. The testing arrangement includes a collision generator configured for generating a collision in response to transmission of the data packet on the network medium, and an analyzer configured for identifying time intervals that the network device under test is transmitting on the network medium. The analyzer, having detected a prescribed minimum number of the identified time intervals, analyzes the identified time intervals to determine the randomness of the random numbers generated by the network device under test. The collision generator may be implemented as a physical layer transceiver configured in a loopback mode, or a packet generator configured for outputting onto the network medium a colliding packet in response to detection of the data packet on the network medium. Hence, the identified time intervals can be used to determine whether sufficiently random numbers are generated for collision mediation according to the IEEE 802.3 TBEB algorithm.

One aspect of the present invention provides a method of testing a network device under test having a media access controller configured for generating random numbers for idle intervals in response to sensed collisions, respectively. The method includes attempting transmission, by the network device under test, of data packets onto a network medium, and generating the collisions in response to each attempted transmission of the data packet. The method also includes identifying time intervals that the network device under test is transmitting on the network medium relative to the idle intervals, and determining a randomness of the idle intervals based on a prescribed minimum number of the identified time intervals.

Another aspect of the present invention provides a testing system for testing a network device under test having a media access controller, where the media access controller is configured for generating random numbers for idle intervals in response to sensed collisions, respectively. The testing system includes a collision generator configured for generating a collision in response to each attempted transmission of a data packet by the network device under test, and an analyzer. The analyzer is configured for identifying time intervals that the network device under test is transmitting on the network medium, and determines a randomness of the idle intervals based on a prescribed minimum number of the identified time intervals.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 2:
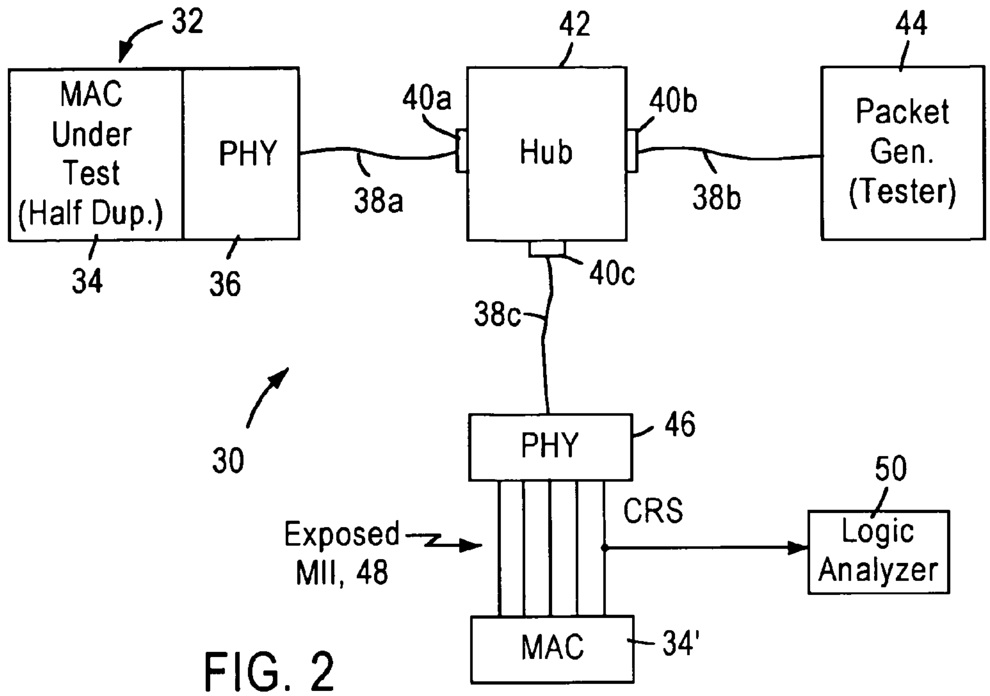
FIG. 2 is a diagram illustrating a system for testing the randomness of idle intervals generated by a network device under test during collision mediation, according to an embodiment of the present invention.

FIG. 2 is a block diagram illustrating a testing system 30 configured for testing an integrated (i.e., single chip) network test device 32. The integrated network test device 32 includes a media access controller (MAC) 34 configured for sending and receiving data packets according to IEEE 802.3 half duplex protocol, and a physical layer transceiver (PHY) 36 configured for transmitting and receiving analog-based network signals carrying the data packets on a network medium 38*a*.

The network test device 32 is connected by the network medium 38*a* to a port 40*a* of a hub 42. In addition, the hub ports 40*b* and 40*c* are used to connect a packet generator 44 and a second physical layer transceiver (PHY) 46 to the network medium 38, respectively. The physical layer transceiver 46 has an exposed media independent interface 48, enabling connection of a logic analyzer 50 to selected lines of the exposed MUI 48. In particular, the logic analyzer 50 is configured for detecting a carrier sense signal (CRS) on the exposed MII 48 generated by the PHY 46 based on detected activity on the network medium 38. Hence, the logic analyzer 50 is able to detect and record activity on the network medium 38, described below.

Figure 1:
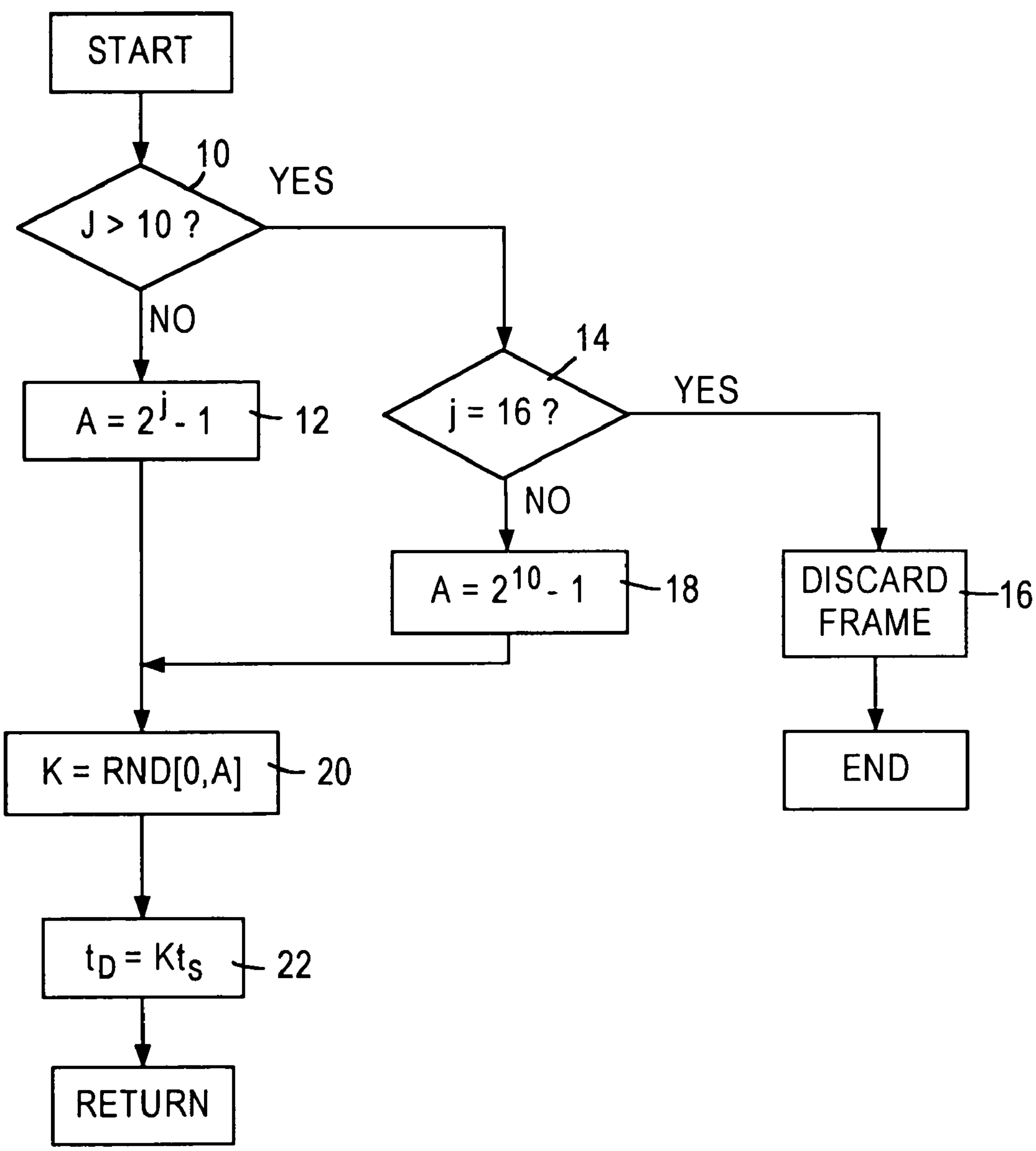
FIG. 1 is a diagram illustrating the IEEE 802.3 truncated binary exponential backoff algorithm.

The packet generator 44 is configured for outputting onto the network medium 38*b* a colliding packet in response to detection of a data packet on the network medium. Hence, any attempted transmission by the network device under test 32 causes the packet generator 44 to force a collision; the MAC 34, having detected the collision on the network medium 38, halts transmission and begins collision mediation according to the TBEB algorithm as described above with respect to FIG. 1.

According to the disclosed embodiment, the network device under test 32 is forced to start packet traffic, causing the packet generator 44 to force a collision. The MAC 34, upon calculating a collision delay interval based on a randomly selected number of slot times, wait the calculated collision delay interval before attempting to retransmit the data packet. The attempted retransmission of the data packet by the network device under test 32 causes the packet generator 44 to force another collision, repeating the collision mediation for sixteen (16) attempts before the packet is dropped by the MAC 34. After the packet is dropped by the MAC 34, the network device under test 32 is forced to retransmit another data packet, repeating the process.

The logic analyzer 50 is configured for identifying the time intervals that the network device under test 32 is transmitting on the network medium 38 based on detecting the asserted carrier sense signal (CRS), and storing the corresponding time interval for the asserted carrier sense signal. Hence, the logic analyzer 50 can determine, for each access attempt by the network device under test 32, the corresponding determined collision delay interval (i.e., the idle interval) selected by the random number generator within the MAC 34.

Once the logic analyzer 50 has collected a prescribed minimum number of identified time intervals (i.e., a statistically significant number of identified time intervals), the logic analyzer 50 can determine the randomness of the collision delay intervals time intervals selected by the MAC 34 based on the identified time intervals. The prescribed minimum number of identified time intervals is based on the desired statistical number of samples, and the time spent on collecting the identified time intervals is based on the amount of time required for a transmitting network node to finish its jam sequence upon detection of a collision. Since the range of randomly selected integers increases exponentially for each access attempt, the logic analyzer 50 can correlate the idle intervals relative to the identified time intervals and based on a determined access attempt, to provide a distribution of selected time intervals for a given access attempt.

Figure 4A:
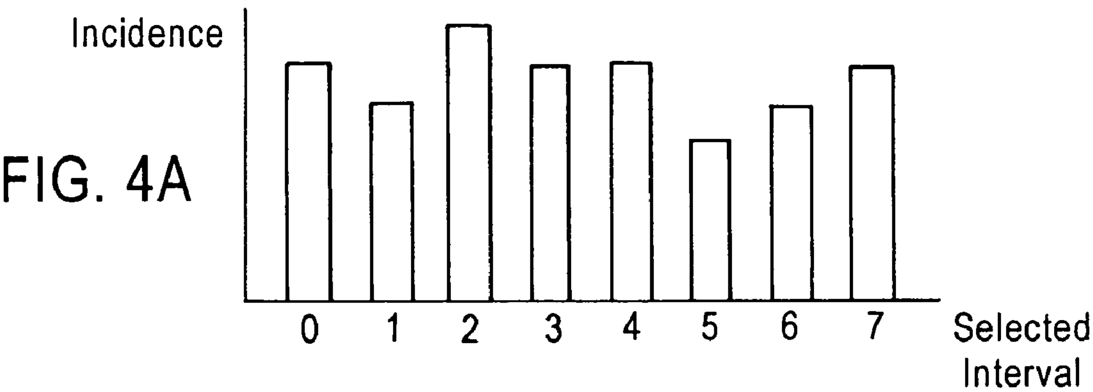
FIGS. 4A, 4B, and 4C are diagrams illustrating the correlation of idle intervals, based on a determined access attempt, for a random distribution, a low distribution, and a high distribution, respectively.
Figure 4B:
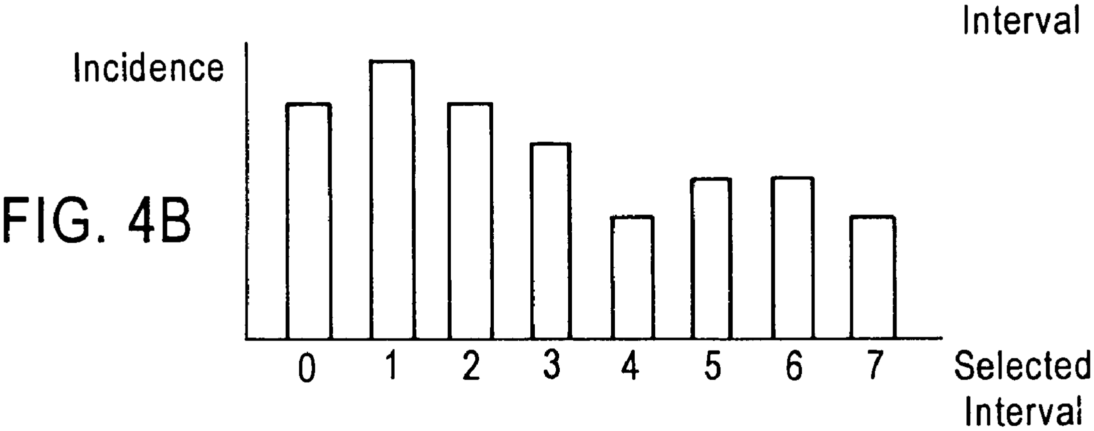
Figure 4C:
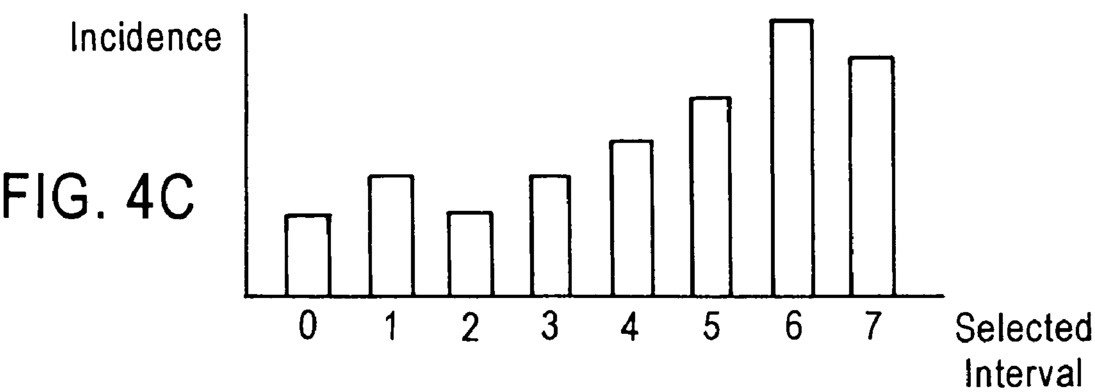

FIGS. 4A, 4B, and 4C are diagrams illustrating a determined distribution of slot times for the collision delay intervals selected by the MAC 34 over time during collision mediation when the number of access attempts equals 3. FIG. 4A illustrates a random distribution, whereas FIGS. 4B and 4C illustrate a low distribution and a high distribution, respectively. Hence, if the logic analyzer determines that the MAC 34 selects slot times resembling the distribution of FIG. 4A, then an engineer can determine that the MAC 34 is compliant with the randomness requirements of the TBEB algorithm.

If the logic analyzer determines that the MAC 34 selects slot times resembling the low distribution of FIG. 4B, then the random number generator within the MAC 34 is overly aggressive in capturing the network medium by tending to select too low a number of slot times for the collision delay interval. If the logic analyzer 50 determines that the MAC 34 selects slot times resembling the high distribution of FIG. 4C, then the random number generator within the MAC 34 tends to lose collision mediation by tending to select to high a number of slot times for the collision delay interval. Hence, a test engineer can validate whether the MAC 34 complies with the TBEB algorithm specified by the IEEE 802.3 protocol based on evaluating the determined distribution of slot times.

Figure 3:
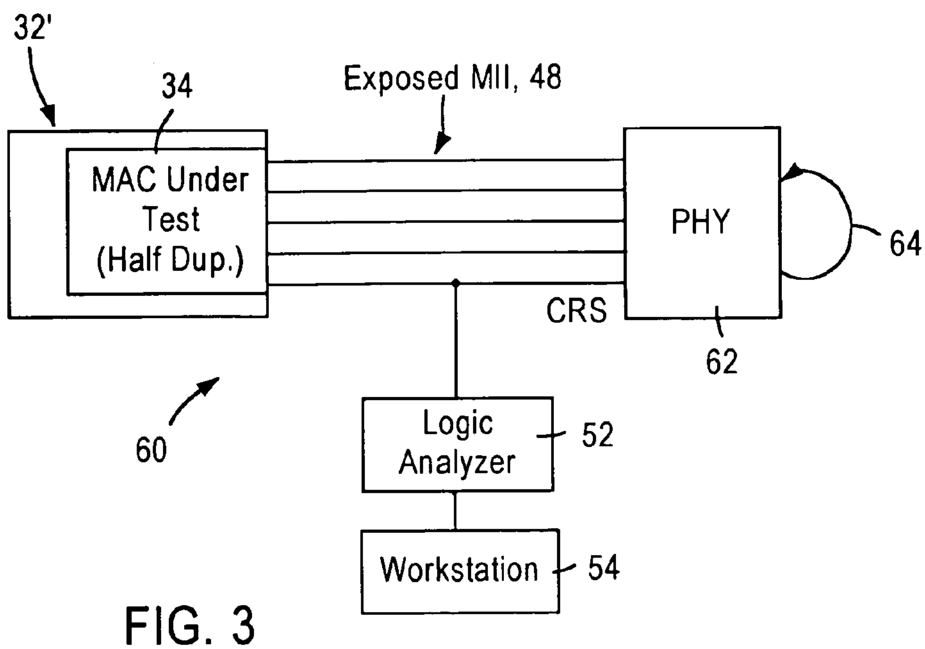
FIG. 3 is a diagram illustrating another system for testing the randomness of idle intervals generated by a network device under test during collision mediation, according to a second embodiment of the present invention.

FIG. 3 is a diagram illustrating another system 60 for testing the randomness of idle intervals generated by a MAC under test during collision mediation, according to another embodiment of the present invention. The illustrated system 60 is usable if the MAC under test 34 has an exposed MII 48 that can be used by the logic analyzer 52 for monitoring the assertion of a carrier sense signal (CRS). In particular, the network device under test 32' has the MAC 34 coupled to an external physical layer transceiver 62 via the exposed media independent interface 48. The physical layer transceiver 62 is configured in a loopback mode for simultaneous transmission and reception of each attempted transmission of the data packet. Hence, each data packet transmitted by the PHY 62 onto the loopback medium 64 is automatically sensed as a colliding data packet, causing the MAC 34 to halt transmission and begin collision mediation.

The logic analyzer 52 differs from the logic analyzer 50 in that the logic analyzer 52 merely the collects the identified time intervals, and forwards the identified time intervals to an external processor 54, such as a test workstation. The external processor 54 performs the above-identified processing to determine the randomness of the collision delay intervals upon receiving the prescribed minimum number of identified time intervals. Hence, a low cost logic analyzer 52 may be used in combination with a test workstation 52 to test the randomness of the collision delay intervals.

According to the disclosed embodiment, the randomness of idle intervals selected during collision mediation can be measured to determine whether a MAC under test complies with the IEEE 802.3 TBEB algorithm. Hence, integrated network devices can be more reliably and more efficiently tested for standards compliance.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method of testing a network device under test having a media access controller configured for generating random numbers for idle intervals in response to sensed collisions, respectively, the method comprising:

attempting transmission, by the network device under test, of data packets onto a network medium;

generating the collisions in response to each attempted transmission of a data packet;

identifying the idle intervals selected by the media access controller; and determining a randomness of the idle intervals based on a prescribed minimum number of the identified idle intervals.

2. The method of claim 1, wherein the step of generating the collisions includes connecting a physical layer transceiver, coupled to the network device under test, in a loopback mode for simultaneous transmission and reception of each attempted transmission of the data packet.

3. The method of claim 2, wherein the network device under test is coupled to a physical layer transceiver via an exposed media independent interface, the identifying step including detecting an asserted carrier sense signal on the exposed media independent interface by a connected logic analyzer, and storing a time interval for the asserted carrier sense signal.

4. The method of claim 3, wherein the determining step includes correlating the idle intervals based on a determined access attempt.

5. The method of claim 1, wherein the step of generating the collisions includes connecting to the network medium a packet generator configured for outputting onto the network medium a colliding packet in response to detection of each attempted transmission of the data packet.

6. The method of claim 5, wherein the identifying step includes detecting, by a logic analyzer, an asserted carrier sense signal generated onto an exposed media independent interface by a physical layer transceiver connected to the network medium, the network analyzer storing a time interval for the asserted carrier sense signal.

7. The method of claim 6, wherein the determining step includes correlating the idle intervals based on a determined access attempt.

8. The method of claim 6, wherein the physical layer transceiver is coupled via the exposed media independent interface to a second media access controller separate from the network device under test.

9. The method of claim 6, wherein the network device under test, the physical layer transceiver, and the packet generator are interconnected to the network medium via a hub.

10. A testing system for testing a network device under test having a media access controller configured for generating random numbers for idle intervals in response to sensed collisions, respectively, the testing system comprising:

a collision generator configured for generating a collision in response to each attempted transmission of a data packet by the network device under test; and an analyzer configured for identifying the idle intervals selected by the media access controller in response to the sensed collisions on the network medium, the analyzer determining a randomness of the idle intervals based on a prescribed minimum number of the identified idle intervals.

11. The system of claim 10, wherein the collision generator includes a physical layer transceiver configured in a loopback mode for identification of said each attempted transmission of the data packet as the corresponding collision.

12. The system of claim 11, wherein the physical layer transceiver is coupled to the network device under test via an exposed media independent interface, the analyzer configured for identifying the idle intervals based on detecting an asserted carrier sense signal on the exposed media independent interface.

13. The system of claim 10, wherein the collision generator includes a packet generator, coupled to a network medium, configured for outputting onto the network medium a colliding packet in response to detection of said each attempted transmission of a data packet on the network medium.

14. The system of claim 13, further comprising a physical layer transceiver coupled to the network medium and having an exposed media independent interface, the analyzer configured for identifying the idle intervals bused on detecting an asserted carrier sense signal on the exposed media independent interface.

15. The system of claim 14, wherein the physical layer transceiver is coupled via the exposed media independent interface to a second media access controller separate from the network device under test.

16. A testing system for testing a network device under test having a media access controller configured for generating random numbers for idle intervals in response to sensed collisions, respectively, the testing system comprising:

a collision generator configured for generating a collision in response to each attempted transmission of a data packet by the network device under test;

an analyzer configured for identifying the idle intervals selected by the media access controller in response to the sensed collisions on the network medium; and a processor configured for determining a randomness of the idle intervals based on a prescribed minimum number of the identified idle intervals.

17. The system of claim 16, wherein the collision generator includes a physical layer transceiver configured in a loopback mode for identification of said each attempted transmission of the data packet as the corresponding collision.

18. The system of claim 17, wherein the physical layer transceiver is coupled to the network device under test via an exposed media independent interface, the analyzer configured for identifying the idle intervals based on detecting an asserted carrier sense signal on the exposed media independent interface.

19. The system of claim 16, wherein the collision generator includes a packet generator, coupled to a network medium, configured for outputting onto the network medium a colliding packet in response to detection of said each attempted transmission of a data packet on the network medium.

20. The system of claim 19, further comprising a physical layer transceiver coupled to the network medium and having an exposed media independent interface, the analyzer configured for identifying the idle intervals based on detecting an asserted carrier sense signal on the exposed media independent interface.

* * * * *